Patented June 5, 1923.

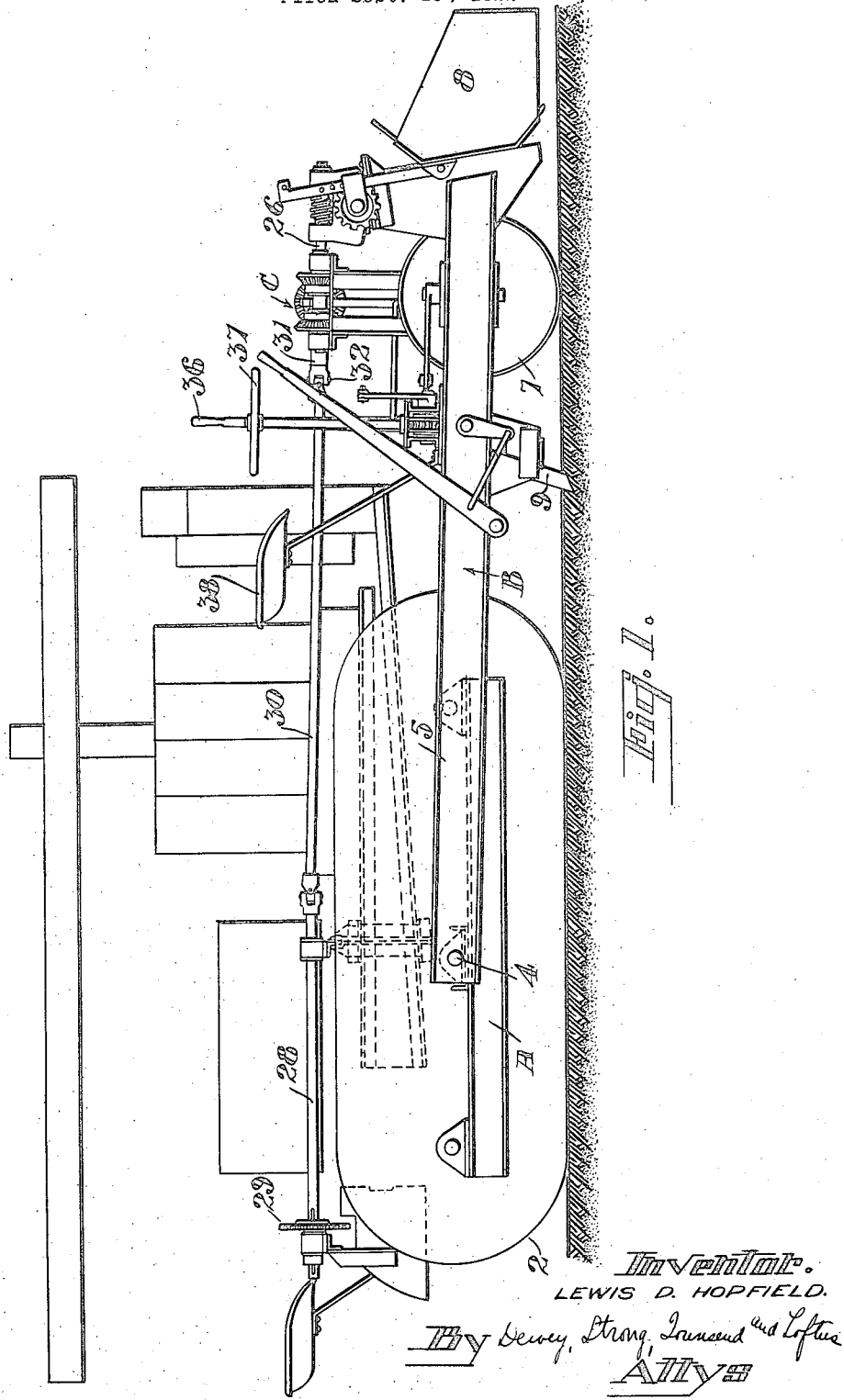

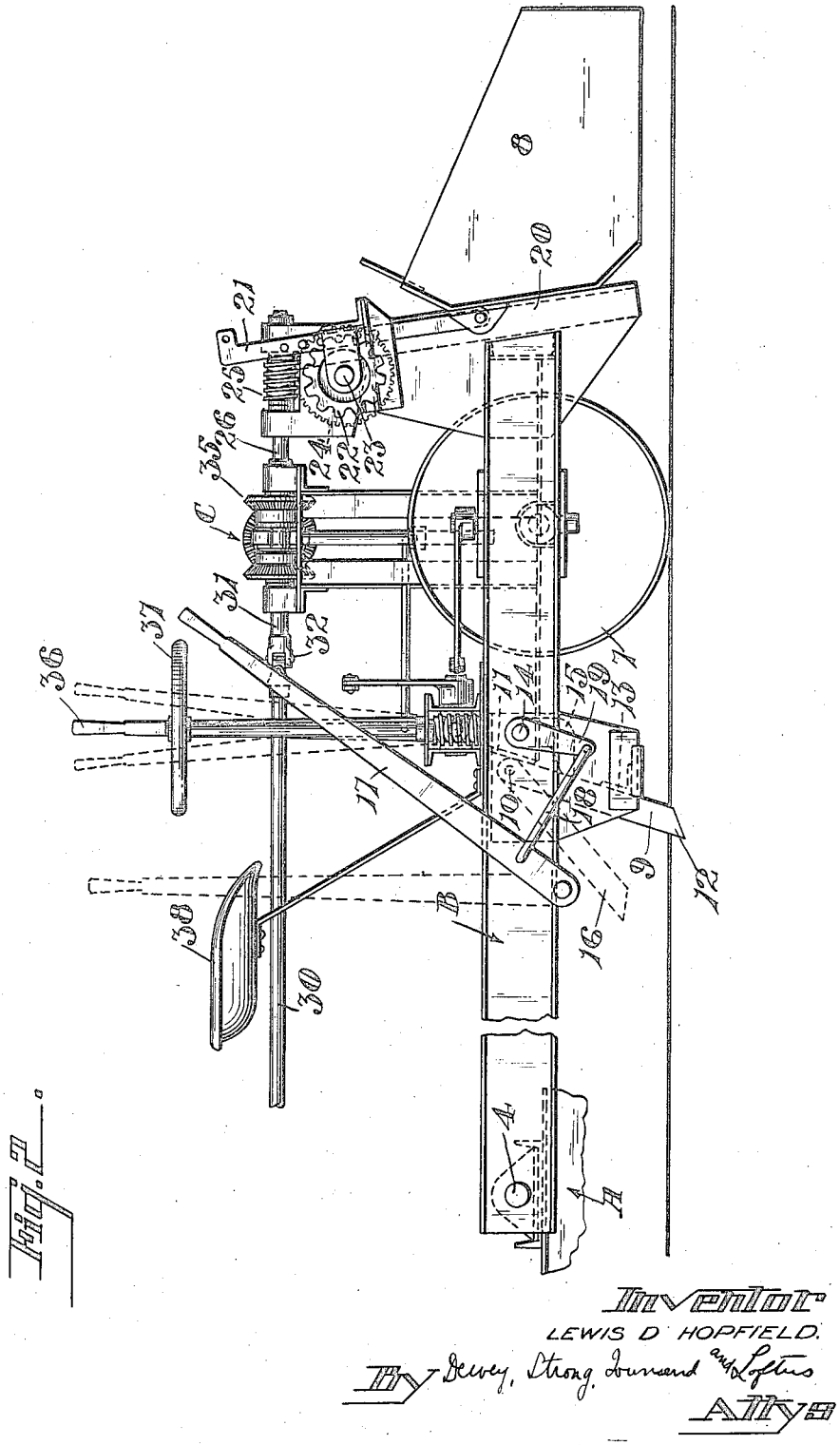

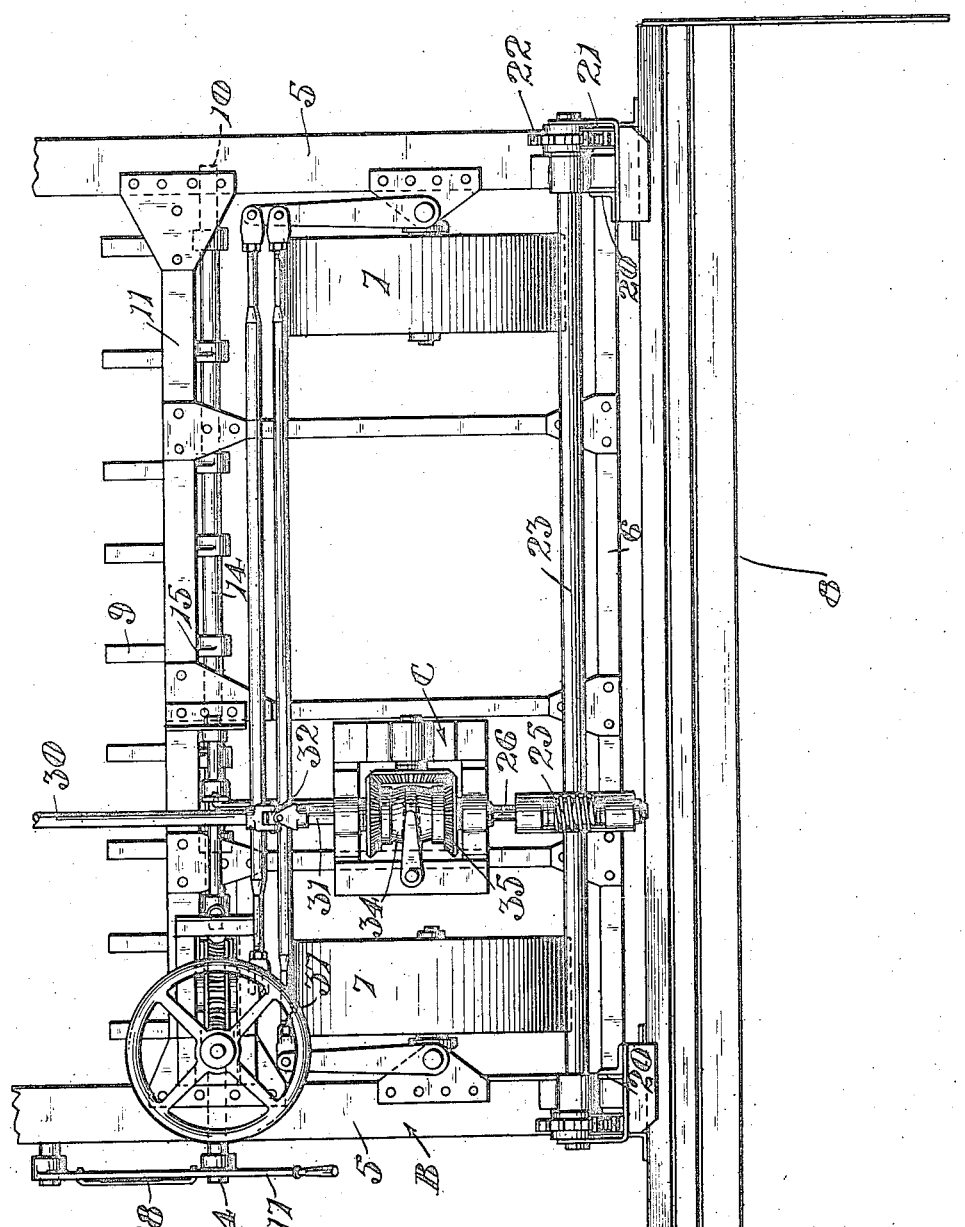

1,457,878

UNITED STATES PATENT OFFICE.

LEWIS D. HOPFIELD, OF NATOMA, CALIFORNIA.

LAND-LEVELING DEVICE.

Application filed September 13, 1922. Serial No. 587,944.

*To all whom it may concern:*

Be it known that I, LEWIS D. HOPFIELD, a citizen of the United States, residing at Natoma, county of Sacramento, and State of California, have invented new and useful Improvements in Land-Leveling Devices, of which the following is a specification.

This invention relates to a land leveling device and especially to improvements on the structure shown in my Patent No. 1,332,872, entitled "Land leveling device," issued March 2, 1919, and also on the structure shown in my copending application entitled "Land leveling device," filed November 29, 1920, Serial No. 426,922.

The object of the present invention is to generally improve and simplify structures of the character refered to; to provide a machine particularly adapted for road work, land leveling and the like; a machine which may be readily attached to a tractor or similar power driven unit and operated in conjunction therewith; to provide a machine which is a combined ground breaker and scraper, and which scrapes when the tractor is travelling ahead and digs or breaks up the ground when backing up, in this manner conserving the entire pull of the tractor for one operation or another. Further objects will hereinafter appear.

The invention more specifically stated embodies a tractor or other power driven machine, a frame or carriage secured to the forward end thereof, a scraper on said carriage, means for transmitting engine power from the tractor to raise and lower the scraper, a set of digging teeth on the carriage, manually actuated means for raising and lowering said teeth, means for supporting the forward end of the carriage independently of the attachment formed with the tractor to permit the carriage to rise and fall when uneven ground formations are encountered, and means on the carriage for assisting the steering operation when the tractor is turning, etc.

One form which my invention may assume is exemplified in the following description and illustrated in the accompanying drawings, in which—

Fig. 1 is a side elevation of a self-laying track type of tractor showing the application of the invention.

Fig. 2 is a side elevation of the carriage which is attached to the tractor and the scraping and digging attachments carried thereby.

Fig. 3 is a plan view of Fig. 2.

Referring to the drawings in detail, and particularly to Figs. 1 and 2, A indicates the main frame of a tractor, which in this instance is driven by a pair of endless self-laying tracks, such as indicated at 2. Extending crosswise of the main frame or the trucks by which the self-laying tracks are supported is a shaft 4 and pivotally secured to the shaft is a pair of forwardly extending frame arms 5 and a plurality of connecting cross members 6, the frame arms 5 and the cross members 6 consisting of the carriage generally indicated at B. This carriage is supported at its forward end by means of a pair of tiller wheels 7, and means are provided for swinging said wheels when the tractor is turning, etc. The carriage is provided as a support for a scraper generally indicated at 8 and a plurality of digging teeth generally indicated at 9. These units are independently operable to the extent that the scraper acts when the tractor is travelling in a forward direction and the teeth 9 when the tractor is reversing or backing up, this being of considerable importance as the entire pull of the tractor is in this manner conserved for one operation or another.

The scraper proper is raised and lowered by means of engine power as will hereinafter be described, while the digging teeth 9 are manually raised or lowered from the carriage. The teeth may be constructed in any suitable manner and are in this instance shown as elongated bars pivotally attached as at 10 to a cross frame 11. The lower ends of the teeth are pointed as at 12 so that they will readily enter and break up the ground when in digging position, and they are supported in digging position by a second cross frame generally indicated at 13. Extending crosswise of the carriage and journalled therein is a shaft 14 and secured on the shaft is a plurality of arms 15. There are as many arms 15 as there are digging teeth 12, and the arms 15 and teeth 12 are placed in alignment so that when a rotary movement is imparted to the shaft 14, arms 15 will engage the teeth and raise them to the dotted lines position shown at 16, turning movement being imparted to the shaft 14 by means of an operating lever 17, a link 18 and a crank arm 19 secured on one end of shaft 14.

The scraper proper is almost identical in construction to that illustrated in my issued and copending applications already referred to, and will for this reason be only briefly mentioned. The forward end of the carriage supports a pair of vertical guides 20 to which the scraper 8 is slidably connected This scraper is large and heavy and engine power is employed for the purpose of raising and lowering the same. Attached to the scraper is a pair of rack bars 21, and intermeshing with each rack bar is a gear 22 secured on the cross shaft 23. Also secured on the cross shaft is a worm gear 24 and intermeshing therewith is a pinion 25 secured on the shaft 26. This shaft is adapted to be rotated in one direction or another and when so rotated imparts a turning movement to the shaft 23 and the gears 22, which mesh with the rack bars 21, in this manner either raising or lowering the scraper as occasion may demand. Means are provided for rotating shaft 26 in one direction or another and this means or mechanism is generally indicated at C. This mechanism consists of a shaft 28 driven from the engine crank shaft of the tractor by a sprocket chain drive 29 and a pair of intermediate shafts 30 and 31. Shaft 30 is splined to one of the gears of the chain drive 29 and as such is longitudinally movable, and shaft 31 is coupled to the shafts 29 and 30 by means of universal couplings as at 32, thus providing a flexible and longitudinally movable driving connection, which is necessary due to the fact that the forward end of the carriage B rises and falls when uneven ground formations are encountered. Shaft 28 drives a cone clutch 34, which is adapted to transmit power to a reversing bevel gear train generally indicated at 35. These gears are all freely turnable on the respective shafts and will remain idle when the clutch assumes a neutral position or will transmit power to rotate the shaft 26 in one direction or another when engagement is made with the respective gears. A double acting cone clutch is employed in this instance, but any suitable form of clutch mechanism may be employed.

The clutch is operated from a lever 36, as shown in Figs. 1 and 2, and is therefore under the control of the operator at all times. The wheels 7 may be supported and swung in any suitable manner and they are actuated by a steering wheel 37. This wheel, together with the levers 17 and 36, is placed within convenient reach of the operator, who remains seated during the operation of the machine, a suitable form of seat for this purpose being indicated at 38.

In actual operation when the tractor is travelling in a forward direction, the operator by grasping the lever 36 adjusts the scraper 8 to any vertical position desired, for instance if fairly uneven ground is encountered, the scraper is set to strike the high spots only and the dirt or gravel is thus removed and carried in a forward direction. When the tractor is reversing or backing up, the teeth 12 are dropped into digging position by means of the lever 17. The teeth will then break up the ground, or in other words the high spots so that when the scraper moves ahead the full power of the machine is utilized in moving the dirt and similarly the full power may be employed for breaking up the ground when backing up. With this arrangement, that is the teeth digging when the machine is backing, the high spots on the ground are broken up and spread so that when the machine moves ahead it will be travelling over ground that has been broken up and to a certain extent leveled, thus reducing the depressions and raises and rendering easier the task of the scraper in scraping and levelling off the land. If a fairly soft soil is encountered the teeth may be permanently raised and not employed, but if they are required they may be left in digging position as they will ride freely over the ground, or in other words drag when the machine is travelling ahead and will automatically enter and break or dig when the machine is backing. The scraper can be readily lowered from time to time as required as engine power is employed for this purpose and is easily controlled by the operator through means of the lever 36. Further, if it is desired to turn the tractor around curves, etc., the steering operation is rendered fairly easy as the operator of the land leveling and scraping device may turn the tiller wheels 7 to assist the operator of the tractor. Direct transmission of engine power to raise and lower the scraper when required is not interfered with at any time as the longitudinal movement of shaft 30 and the universal couplings employed between the shafts 30 and 28 permit free movement of the carriage in a vertical direction without disturbing the driving connections. The mechanism is therefore operable under all conditions and is under perfect control of the operator, the important feature of the present invention being that the entire engine power of the tractor is conserved in one instance for scraping and moving the dirt, and in the other instance for digging or breaking up the ground, thereby materially increasing the efficiency of the land leveling device and similarly the capacity of the same.

Having thus described my invention, what I claim and desire to secure by Letters Patent is—

1. A land leveling device comprising a tractor, an auxiliary frame, a pivotal connection between one end of said frame and the tractor, wheels supporting the opposite end of the frame, a scraper carried by the auxiliary frame and operable when the tractor travels in one direction, and digging teeth carried by the auxiliary frame and operable only when the tractor is travelling in the opposite direction.

2. A land leveling device comprising a tractor, an auxiliary frame, a pivotal connection between one end of said frame and the tractor, wheels supporting the opposite end of the frame, a scraper carried by the auxiliary frame and operable only when the tractor is travelling in a forward direction, and digging teeth carried by the auxiliary frame and operable only when the tractor is backing.

3. A land leveling device comprising a tractor, an auxiliary frame, a pivotal connection between one end of said frame and the tractor, wheels supporting the opposite end of the frame, a scraper carried by the auxiliary frame and operable only when the tractor is travelling in a forward direction, digging teeth carried by the auxiliary frame and operable only when the tractor is backing, and means for transmitting power from the tractor to raise and lower the scraper.

4. A land leveling device comprising a tractor, an auxiliary frame, a pivotal connection between one end of said frame and the tractor, wheels supporting the opposite end of the frame, a scraper carried by the auxiliary frame and operable only when the tractor is travelling in a forward direction, digging teeth carried by the auxiliary frame and operable only when the tractor is backing, and manually actuated means for raising and lowering the digging teeth.

5. A land leveling device comprising a tractor, an auxiliary frame, a pivotal connection between one end of said frame and the tractor, wheels supporting the opposite end of the frame, a scraper carried by the auxiliary frame and operable only when the tractor is travelling in a forward direction, digging teeth carried by the auxiliary frame and operable only when the tractor is backing, means for transmitting power from the tractor to raise and lower the scraper, and manually actuated means for raising and lowering the digging teeth.

6. In a device of the character described the combination with the tractor and the auxiliary frame attached hereto, of a scraper carried by the frame and vertically adjustable thereon, said scraper being operable only when the tractor travels in one direction, a cross bar on the frame, a plurality of digging teeth pivotally attached thereto, and operable only when the tractor travels in an opposite direction, and manually actuated means for raising and lowering the teeth in unison.

7. In a device of the character described the combination with the tractor and the auxiliary frame attached thereto, of a scraper carried by the frame and vertically adjustable thereon, said scraper being operable only when the tractor travels in one direction, a cross bar on the frame, a plurality of digging teeth pivotally attached thereto, and operable only when the tractor travels in an opposite direction, and manually actuated means for raising and lowering the teeth in unison, said means comprising a shaft journalled crosswise of the auxiliary frame, a plurality of arms secured to the shaft one in alignment with each digging tooth and engageable therewith, and manually actuated means for transmitting a turning movement to the shaft and arms to cause the arms to engage the respective teeth and thereby raise and lower the same.

8. In a device of the character described the combination with the tractor and the auxiliary frame attached thereto, of a scraper carried by the frame and vertically adjustable thereon, said scraper being operable only when the tractor travels in one direction, a cross bar on the frame, a plurality of digging teeth pivotally attached thereto, and operable only when the tractor travels in an opposite direction, manually actuated means for raising and lowering the teeth in unison, said means comprising a shaft journalled crosswise of the auxiliary frame, a plurality of arms secured to the shaft one in alignment with each digging tooth and engageable therewith, and manually actuated means for transmitting a turning movement to the shaft and arms to cause the arms to engage the respective teeth and thereby raise and lower the same, and a second cross bar carried by the auxiliary frame with which the lower ends of the teeth engage when in digging position.

9. In a device of the character described the combination with the tractor and the auxiliary frame attached thereto, of a scraper carried by the auxiliary frame and vertically adjustable with relation thereto, and means for transmitting engine power from the tractor to raise and lower the scraper, said means comprising a shaft continuously driven from the engine on the tractor, means permitting longitudinal movement of said shaft, a second shaft having a universal coupling connection therewith, a reversing gear mechanism carried by the auxiliary frame, and also having a universal coupling connection with said shaft, and means for transmitting power from the reversing gear mechanism to raise and lower the scraper.

LEWIS D. HOPFIELD.